United States Patent [19]
Edlinger et al.

[11] Patent Number: 6,097,544
[45] Date of Patent: Aug. 1, 2000

[54] OPTICAL ELEMENT WITH TWO OPTICAL SYSTEMS HAVING IDENTICAL OPTICAL PATHS

[75] Inventors: Johannes Edlinger, Frastanz, Austria; Sabine Hessler, Balzers, Liechtenstein

[73] Assignee: Balzers Hochvakuum AG, Switzerland

[21] Appl. No.: 09/061,378

[22] Filed: Apr. 16, 1998

[30] Foreign Application Priority Data

Mar. 25, 1998 [CH] Switzerland ............... 711/98

[51] Int. Cl.[7] .................... G02B 27/14; G02B 27/12
[52] U.S. Cl. ............ 359/634; 359/629; 359/638; 359/639; 359/640
[58] Field of Search .................. 359/634, 646, 359/629, 632, 636, 638, 639, 640

[56] References Cited

U.S. PATENT DOCUMENTS

| | | | |
|---|---|---|---|
| 2,737,076 | 3/1956 | Rock, Jr. ........................... | 156/99 |
| 2,754,718 | 7/1956 | Rock, et al. ....................... | 156/281 |
| 4,913,528 | 4/1990 | Hasegawa .......................... | 359/638 |
| 5,042,912 | 8/1991 | Sato et al. ........................ | 359/638 |
| 5,098,183 | 3/1992 | Sonehara .......................... | 353/31 |
| 5,198,928 | 3/1993 | Chauvin ........................... | 359/465 |
| 5,236,541 | 8/1993 | Sugahara .......................... | 156/556 |
| 5,237,442 | 8/1993 | Khoe, et al. ...................... | 359/189 |
| 5,245,472 | 9/1993 | Hegg .............................. | 359/646 |
| 5,260,830 | 11/1993 | Nishida .......................... | 359/634 |
| 5,373,394 | 12/1994 | Oh ............................... | 359/634 |
| 5,644,432 | 7/1997 | Doany ............................ | 359/634 |
| 5,749,641 | 5/1998 | Brice et al. ...................... | 353/81 |
| 5,816,675 | 10/1998 | Brice et al. ..................... | 353/31 |
| 6,019,474 | 2/2000 | Doany et al. ..................... | 353/33 |

FOREIGN PATENT DOCUMENTS

| | | | |
|---|---|---|---|
| 0359461 | 3/1990 | European Pat. Off. | G02B 5/30 |
| 4033842 | 4/1991 | Germany | G02B 27/10 |
| 9820383 | 5/1998 | Switzerland | G02B 87/14 |

OTHER PUBLICATIONS

European Search Report for EP 99 10 4029.

*Primary Examiner*—Georgia Epps
*Assistant Examiner*—Sared Seyrafi
*Attorney, Agent, or Firm*—Notaro & Michalos P.C.

[57] ABSTRACT

An optical element is made of a material that is transparent to a selected spectral band and has an embedded optical layer system. The optical layer system has a first optical system in a first plane which at least predominately reflects light from a first band in the spectral band, and at least predominately transmits light from a second band in the spectral band. A second optical system is also provided in a second plane that intersects the first plane in a central area of the body of the optical element. The second system predominately transmits light from the first band and predominately reflects light from the second band. Optical paths are defined in the optical element between first and second entrances and exits for the light of the first and second bands.

16 Claims, 3 Drawing Sheets

OPTICAL ELEMENT WITH TWO OPTICAL SYSTEMS HAVING IDENTICAL OPTICAL PATHS

FIELD AND BACKGROUND OF THE INVENTION

The present invention concerns an optical element made of material that is transparent to light from at least a first and a second spectral band, where in the element an optical system is embedded which comprises:

a first optical layer system in a first plane which at least predominantly reflects light from the first band and at least predominantly transmits light from the second band;

a second optical layer system in a second plane that intersects the first plane in a central area of the body and at least predominantly transmits the light from the first band and at least predominantly reflects the light from the second band;

with a first entrance or exit surface for light from the first band;

with a second entrance or exit surface for light form the second band, as well as with an exit or entrance surface for light from the first as well as the second band.

The present invention is based on problems that result from so-called X-cubes. An X-cube is a specific design version of said optical element and is a preferred design version also within the framework of this invention. On the X-cube the two planes of said optical layer system intersect perpendicularly. The optical element, intersected perpendicularly to the plane of the layer system, defines a square surface. The two entrance or exit surfaces are formed by parallel, plane surfaces as well as the exit or entrance surface that is perpendicular thereto. Opposite the latter is another entrance or exit surface, a third one, is provided for light from a third spectral band.

Such elements which are often referred to as X-cubes, a term that is also used in the present description, are used, for example, in projectors in order to recombine RED/GREEN and BLUE channels. Rather than for recombination such elements can also be used for color splitting by reversing the optical path. With respect to such elements, reference can be made to U.S. Pat. No. 2,737,076

U.S. Pat. No. 2,754,718

DE 40 33 842 and with respect to their application, to

JP 7-109443

U.S. Pat. No. 5,098,183

EP 0 359 461

We also refer to the PCT application PCT/CH97/00411 corresponding to U.S. patent application Ser. No. 08/756, 140, filed Nov. 26, 1996 which is an integral part of this description and explains in particular the preferred manufacturing process for such X-cubes or optical elements.

FIG. 1 illustrates the utilization of an X-cube for light recombination. The light $L_1$ from a first spectral range, such as in particular the RED range of 600 nm to 800 nm is reflected via the first entrance or exit surface $K_1$ on the first layer system $S_1$, partially after transmission by the second optical layer system $S_2$, and leaves the X-cube at the exit or entrance surface $K_4$.

Light $L_2$ from a second spectral range, in particular the BLUE range of 400 nm to 500 nm is applied to the second entrance or exit surface $K_2$, is reflected—after partial transmission by the first system $S_1$—by the second optical layer system $S_2$ and reaches said exit or entrance surface $K_4$ together with light $L_1$.

In particular when such an optical element, in particular an X-cube, is used in said application, light $L_3$ from a third spectral range, in particular the GREEN range of 500 nm to 600 nm is applied to the optical element at a third entrance or exit surface $K_3$, transmitted by both optical layer systems $S_1$ and $S_2$, and leaves the element at the common exit or entrance surface $K_4$.

The optical layer systems $S_1$ or $S_2$ respectively are formed by one or more optically effective layer(s) as described in particular in U.S. patent application Ser. No. 08/756,140, filed Nov. 26, 1996, and incorporated here by reference.

The light L1, L2 and L3 from said three spectral ranges is often applied to element 3 via light valves $l_1$, $l_2$ and $l_3$, in particular through LCD arrangements. By means of the optical layer systems $S_1$ and $S_2$, which are dielectric reflectors, the imaginary images of the first and second spectral range, corresponding to $L_1$ and $L_2$, and as mentioned, in particular of the RED and BLUE spectral range, are made to coincide via the corresponding light valves $l_1$ and $l_2$ with the real image of the third spectrum, corresponding to $L_3$, particularly preferred from the GREEN spectrum, via the assigned light valve $l_3$.

The better the coincidence the better the projected image.

This requires in particular very close mechanical tolerances for the optical element.

As mentioned, such an element can be used for color splitting by reversing the optical path illustrated in FIG. 1, in particularly for use with a CCD camera. Such an element—not only in the specific design as an X-cube but also in the generalized form referred to at the beginning—is in particular afflicted by the disadvantages explained below.

If, as shown schematically in FIG. 2 with respect to the special situation of the X-cube, light $L_1$ from the first spectral range and light $L_2$ from the second spectral range impinge on element 3, this normally results in a difference in the length of optical path $l_{o1}$, $l_{o2}$ between the corresponding entrance and exit surfaces $K_1$ and $K_2$ respectively, the assigned optical layer systems $S_1$, $S_2$ and the exit or entrance surface $K_4$, due to dispersion even if along the optical paths of light $L_1$ and light $L_2$ the same component material is used which in the case of X-cubes is normally a glass, in particularly BK7 glass. For the illustrated perpendicular light incidence the difference in the length of path is as follows:

$$\Delta l_o = n_2 - n_1\ (W) = l_{o2} - l_{o1}$$

where $\Delta l_o$: is the difference of the optical length of path $l_{o1}$, $l_{o2}$ for light $L_1$, $L_2$ of the two mentioned spectra;

$n_1$, $n_2$: are the refractive indices of the material of the optical element along the corresponding optical paths;

W: is the geometric path of light $L_1$, $L_2$.

If along the optical paths different geometric paths $W_1$ or $W_2$ must be taken into consideration, the formula is:

$$\Delta l_o = n_2 \cdot W_2 - n_1 \cdot W_1$$

Normally, however, identical mechanical or geometric lengths of path $W_1$, $W_2$ are chosen. For an X-cube made of BK7 glass with a cross-sectional edge length of 40 mm we obtain for light of a given wavelength $L_1$ in the first spectral range:

$$\lambda_1 = 643.8 \text{ nm}$$

and for light from a second spectral range of a given wavelength $\lambda_2$:

$$\lambda_2 = 435.8 \text{ nm}$$

an optical path length difference $\Delta l_0$ of $$\Delta l_0 = 0.4789 \text{ nm} = 40 \text{ nm} \cdot (n_2 - n_1).$$

For an imaging system downstream the optical element produces an image in the spectrum corresponding to $L_1$ and in the spectrum corresponding to $L_2$, in particular in the RED and BLUE spectra, with simultaneous light impingement on the element, which results from two object planes that are mutually offset by $\Delta l_0$.

This difference in the optical path lengths can be corrected externally with respect to the optical element by installing the light valves $l_1$ and $l_2$ shown in FIG. 1. at different distances from the corresponding entrance and exit surfaces $K_1$ and $K_2$ respectively. However, this requires a considerable installation and adjustment effort. If light valves $l_1$ and $l_2$ are installed equidistant from the assigned entrance or exit surfaces of the element, this leads to image blurring due to said differences in the optical path lengths.

The imaging equations for an optical system with the main planes $K_1$ and $K_3$ as shown in FIG. 3 and exposed to air on both sides give $$1/a' = 1/a = 1/f$$

where
 a: Object distance=$AK_3$
 a' Image distance=$K_1A'$
 f: Focal length of the system
The difference of the object distance by $\Delta l$ causes a difference of the image distance by $\Delta a'$ resulting in:

$$\Delta a' = f'(a + \Delta l)/(f' + a + \Delta l) - f'a/(f' + a).$$

This means that also the imaging scale $\beta$ is influenced. For the latter the formula is:

$$\beta = a'/a.$$

For an image that should have a magnifying effect, object A must be within the single to double focal length f', that is,:

$$f' \leq |a| \leq 2f'.$$

EXAMPLE f'=50 mm,
a=−60 mm
$\Delta l$=−0.4784 mm,
in which case $\Delta a'$=11.41 mm and the magnifying scale $\beta$ for imaging of A is −5, for imaging of $A_n$ it is 4.772 where $A_n$ represents the image on the object distance $(a+\Delta l)$.

SUMMARY OF THE INVENTION

The purpose of the present invention is to remedy said disadvantage on previously known elements of the type outlined in the beginning. In the element according to the invention this is achieved in that the optical paths for light of a predetermined wavelength from the first band and for light of a predetermined wavelength from the second band are identical between the assigned entrance and exit surfaces via the assigned reflecting optical layer systems to the exit or entrance surface.

In another far preferred design version the material of the element is chosen to be identical at least along said optical paths $l_{01}$, $l_{02}$, and geometric paths corresponding to the optical paths for light of said wavelengths are designed to be different, thereby more different than would be caused just by the manufacturing tolerances of the optical element. As the mechanical path we understand the path measured in a unit of linear extent of the corresponding light assigned to one of the entrance or exit surfaces $K_1$ or $K_2$ in FIG. 1, to the correspondingly assigned reflecting optical layer system $S_1$, $S_2$ and further to the exit or entrance surface, corresponding to $K_4$ of FIG. 1.

In another far preferred design version of the optical element the two entrance or exit surfaces are formed by parallel, plane surfaces and the first and second planes in which the optical layer systems are located intersect with on offset relative to a center plane of said parallel surfaces.

In particular if identical materials are chosen along said optical paths, and in particular on an X-cube element—as defined above—, a very simple possibility is created for compensating the differences of optical path lengths by means of the mechanical path lengths.

On another preferred design version of the optical element according to the invention, the first and the second plane—in which the optical systems are arranged—are perpendicular with respect to each other. Further the two entrance or exit surfaces are preferably formed by parallel, plane surfaces where further preferred a 45° angle is formed between the first entrance or exit surface and the first plane and respectively between the second entrance or exit surface and the second plane. In this preferred design version, the optical element according to the invention consequently has a rectangular cross-sectional surface perpendicular to the planes of the optical layer system, which is square.

Although, as has become clear, the present invention deals principally with the problems resulting from the spectral bands reflected on the optical layer systems, it is proposed for another preferred design version of the optical element according to the invention that the first and second optical layer systems transmit light from a third spectral range at least predominantly and that a third entrance or exit surface for this light be provided—as shown by $K_3$ in FIG. 1—where the entrance or exit surface—as shown by $K_4$ in FIG. 1—is used for light from all three bands.

In a preferred design version the first two entrance and exit surfaces, the third and said entrance or exit surface, are arranged in pairs perpendicularly to each other and thereby preferably define a body with a square cross-section.

In another preferred design version in which along the optical path of the light from the first spectral band the material of the element has the refractive index $n_1$, and along the optical path for light of the second spectral band the refractive index $n_2$, the corresponding mechanical paths $l_{m1}$ and $l_{m2}$ are realised as follows:

$$l_{m1}/l_{m2} = n_2/n_1$$

within the frame of manufacturing tolerances of the optical element.

As mentioned the RED range for the first spectral band is chosen in a far preferred version according to 600 nm to 800 nm wavelength, for the second spectral band the BLUE range is chosen according to 400 nm to 500 nm wavelength and for the third spectral band the GREEN range is chosen according to 500 nm to 600 nm wavelength.

With respect to said first spectral bands and as dimensioning wavelengths, specifically selected wavelengths, e.g. at the intensity maximum of the light source, are preferably chosen, e.g. for said preferred spectral bands $\lambda_1 = 620$ nm $\lambda_2 = 440$ nm in accordance with the light source to be used.

In another preferred design version of the element according to the invention the optical systems are formed by a layer system each, where one of the two systems is formed by a layer system that is continuous across the interface to the second system. To thereby minimize interferences of optical imaging also at the intersection area of the two systems, it is further proposed that the continuous layer system shall have a maximum deformation out of its plane of at most 5 $\mu$m, preferably of at most 2 $\mu$m.

Further, a preferred version of the optical element according to this invention has a cross-sectional area, perpendicular to the first and second planes, which essentially forms a square and on which opposed edges of one of the entrance or exit surfaces are chamfered, preferably parallel to the first and respectively second plane.

By means of the element according to the invention, which compensates itself the differences of the optical wavelengths, it is now possible to most advantageously mount light valves, in particular LCD panels, directly on the corresponding entrance or exit surfaces, for example, as shown in FIG. 1, directly on surfaces $K_1$ and $K_2$ and possibly $K_3$. In this way high costs for mounting and adjusting of the corresponding panels can be saved and the entire design becomes very compact. Further, the said surfaces of the element according to the invention can be equipped with an electrode layer, e.g. by coating with an ITO layer which functions as an electrode for said directly applied light valve arrangements, in particular, LCD panels. The optical element according to the invention is particularly suited as a light combination element on a projection arrangement or as light-splitting element on an image registering arrangement, in particular on a CCD camera. A process according to the invention for manufacturing an optical element according to the present invention, designed as an X-cube, is characterized by the wording in claim 14.

It is based on a cube made of uniform material on which the two optical systems are arranged in center planes. With respect to a far preferred manufacturing technique for this intermediate product we refer fully to the above-identified U.S. patent application Ser. No. 08/756,140.

In the process according to the invention two corner prisms are cut off, preferably simultaneously, from the cube, parallel to one of the cube diagonal surfaces and asymmetrically thereto, and subsequently the X-cube cross-sectional surface is completed, through preferably simultaneous cutting off of the remaining two corner pieces, perpendicularly to said diagonal surface of the cube.

Said cubes are manufactured preferably much longer than is needed for a single X-cube. The X-cubes are cut to size only after said cutting operations.

BRIEF DESCRIPTION OF THE DRAWINGS

Preferred embodiments of the invention are subsequently and additionally explained on the basis of additional illustrations as examples. The respective figures show.

DESCRIPTION OF THE PREFERRED EMBODIMENT

Figure 4:
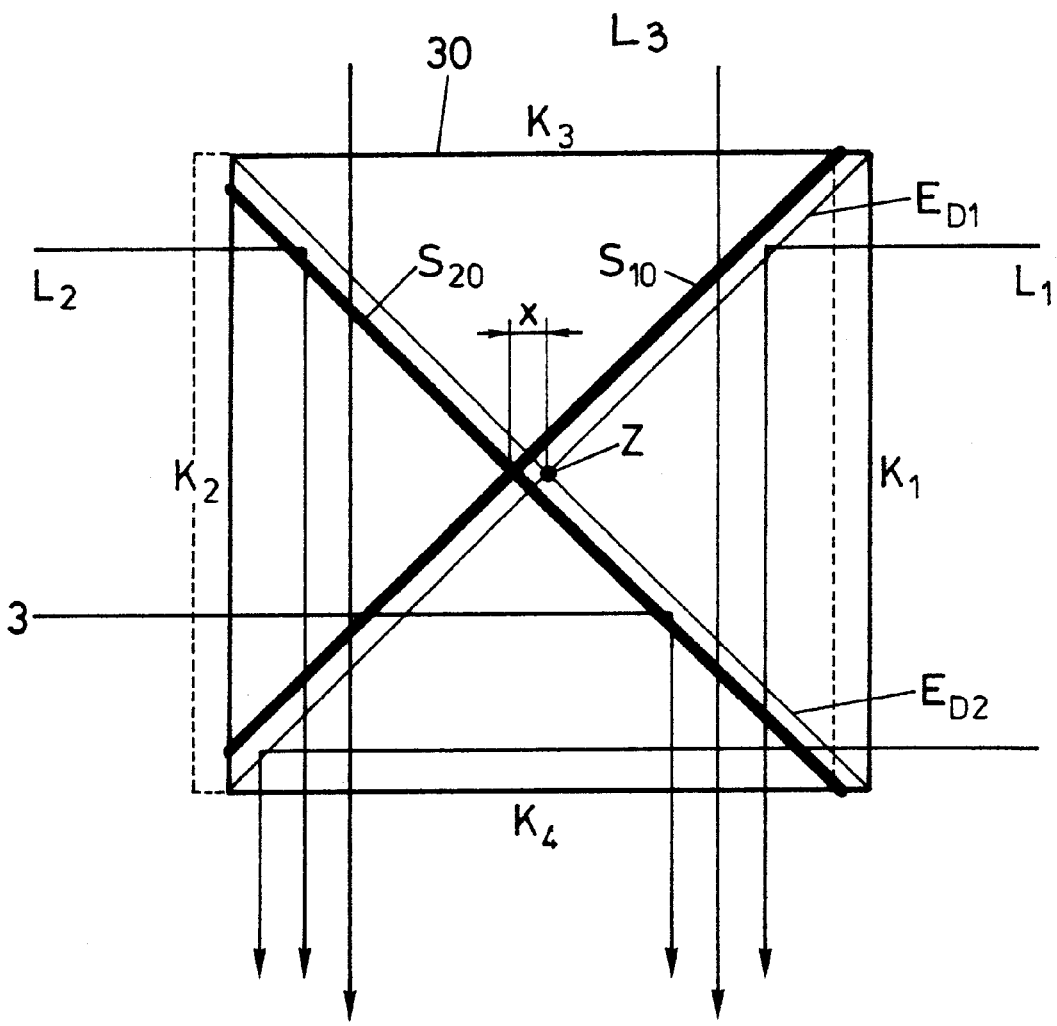

As shown in FIG. 4, on an X-cube 30 according to the invention the mechanical path for light $L_1$ from the first spectral range, preferably said RED range, and for light $L_2$ from the second spectral range, preferably from the BLUE range, is designed as shown in FIG. 4, mechanically different in such a way that for both spectral ranges the optical paths are essentially of equal length, are for specifically chosen dimensioning wavelengths exactly equal in length. With $l_m$ as mechanical path length the formula is valid:

$$n_1 \cdot l_{m1} = n_2 \cdot l_{m2} = n_1 \cdot (l_{m1} + x).$$

This consequently results in:

$$x = l_{m1} \cdot (n_1 - n_2)/n_2.$$

For the preferred spectral ranges RED and BLUE we obtain:

$$x = l_{mblue}(n_{blue} - n_{red})/n_{red}.$$

For example for $l_{mblue} = 40$ mm we obtain x to 0.3158 mm, with a BLUE wavelength $\lambda_2$ of 435.8 nm and a RED wavelength $\lambda_1$ of 643.8 nm.

Figure 1:
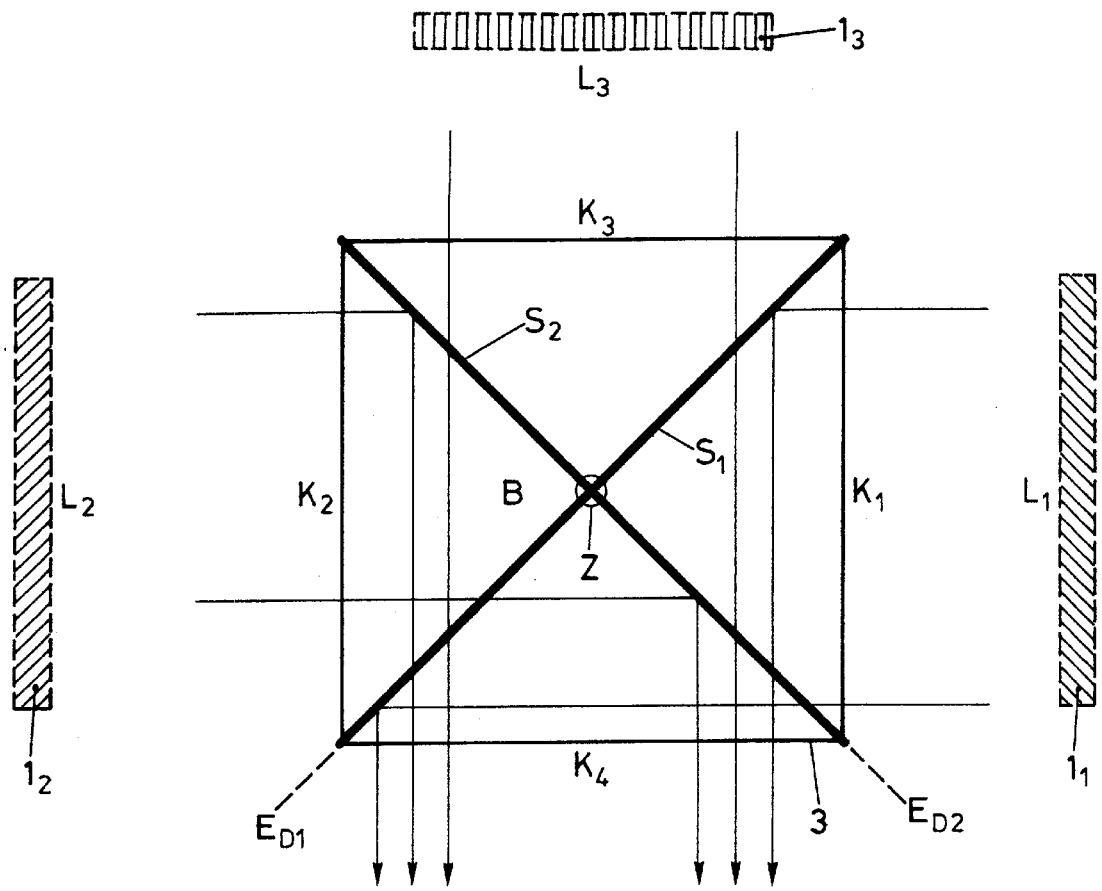
FIG. 1 A known X-cube, used on a light recombination arrangement such as on a projection arrangement, FIG. 2 Schematically an X-cube according to the state of the art, for explaining the optical path length difference $\Delta l_0$ resulting from the dispersion, FIG. 3 Based on the schematic diagram of an optical imaging system the effects on imaging if the object is presented simultaneously on different object distances, FIG. 4 A cross-section through an X-cube according to the invention as the preferred element according to the invention, FIG. 5 Schematically manufacturing of an X-cube based on the process according to the present invention, beginning with an intermediate cuboid product of the type as explained in detail in U.S. patent applicaion Ser. No. 08/756,140.
Figure 2:
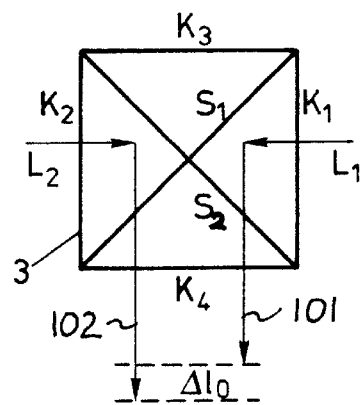
Figure 3:
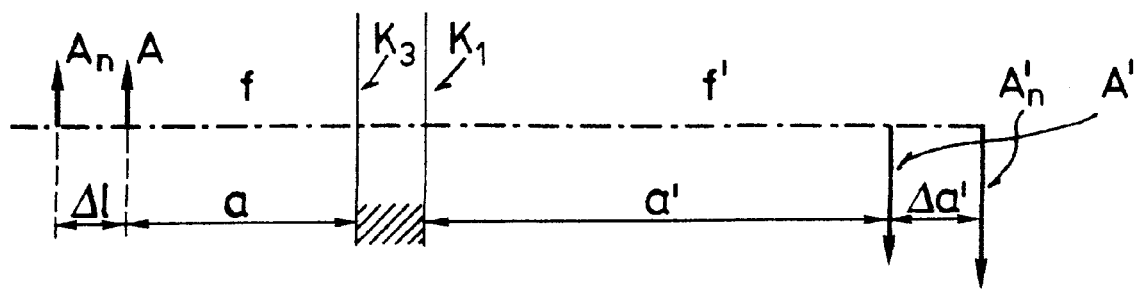

In FIG. 4 the diagonal body planes $E_{D1}$ and $E_{D2}$ are shown on an X-cube according to the invention with a square cross-sectional surface, analogously to FIG. 1. They intersect at a right angle and define the center Z of the square cross-sectional surface. The optical layer systems $S_{10}$ and $S_{20}$ intersect with each other at a locus which is offset by said dimension x towards that entrance surface $K_2$ where light with the shorter wavelength, as for example the light in the BLUE spectral range, penetrates.

As a result the mechanical path $l_{m1}$ becomes longer than the mechanical path $l_{m2}$ by the same amount that the optical path on the X-cube according to FIG. 1, $l_{01}$ is shorter than the optical path $l_{02}$ of the light with the longer wavelength.

Due to the fact that directly at the element according to the invention the difference of the optical path lengths is compensated by different mechanical path lengths, it is possible to apply light valve arrangements, in particular LCD arrangements, directly on the element—in particular on surfaces $K_1$ and $K_2$ of the X-cube as shown in FIG. 4, and optimally also on surface $K_3$.

Figure 5:
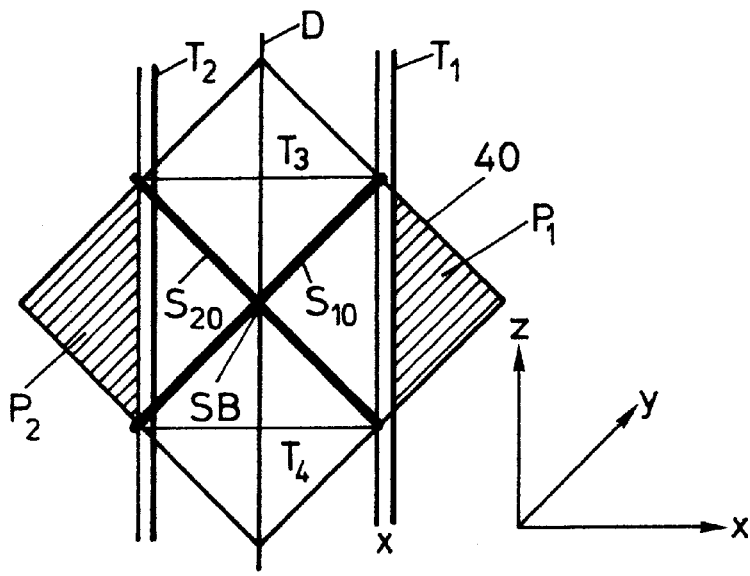

Based on FIG. 5 a preferred process for manufacturing an X-cube according to the invention is illustrated. This process starts with an intermediate product, that is, an extended cube 40, in which the optical layer systems $S_{10}$ and $S_{20}$ are arranged in center planes.

The procedure for manufacturing such an intermediate extended cube 40 of a preferred design is described in U.S. patent application Ser. No. 08/756,140. In this respect explicit reference is made to FIGS. 1 to 4h of said U.S. patent application Ser. No. 08/756,140 and the corresponding description. As can be seen from FIG. 5, two prisms $P_1$ and $P_2$ are cut off from said intermediate product cube 40, by plane cuts such as by sawing along the parallel planes $T_1$ and $T_2$. The cuts at $T_1$ and $T_2$ are executed in such a way that the intersection area SB of the two optical layer systems $S_{10}$ and $S_{20}$ is offset by x towards one of the cutting surfaces $T_1$, $T_2$ as has been explained in FIG. 4. Preferably cube 40 is positioned with its holder on an xyz-table in an orientation as shown in FIG. 5 and the cuts at $T_1$ and $T_2$ are made by deflecting the xyz table by the amount x. Subsequently the X-cube is finished symmetrically to SB by executing again plane parallel cuts $T_3$ and $T_4$. The result is an X-cube as shown in the cross-sectional diagram FIG. 6 with characteristically chamfered edges at M. Cuts $T_1$, $T_2$ and $T_3$, $T_4$ respectively are preferably executed at the same time. Preferably cube 40 has such a length in the y direction of FIG. 5 that after cuts $T_1$ to $T_4$ have been made in said direction, several X-cubes can be cut from the same cube 40.

The chamfered areas form surfaces that are each parallel to one of the optical layer systems.

Figure 6:
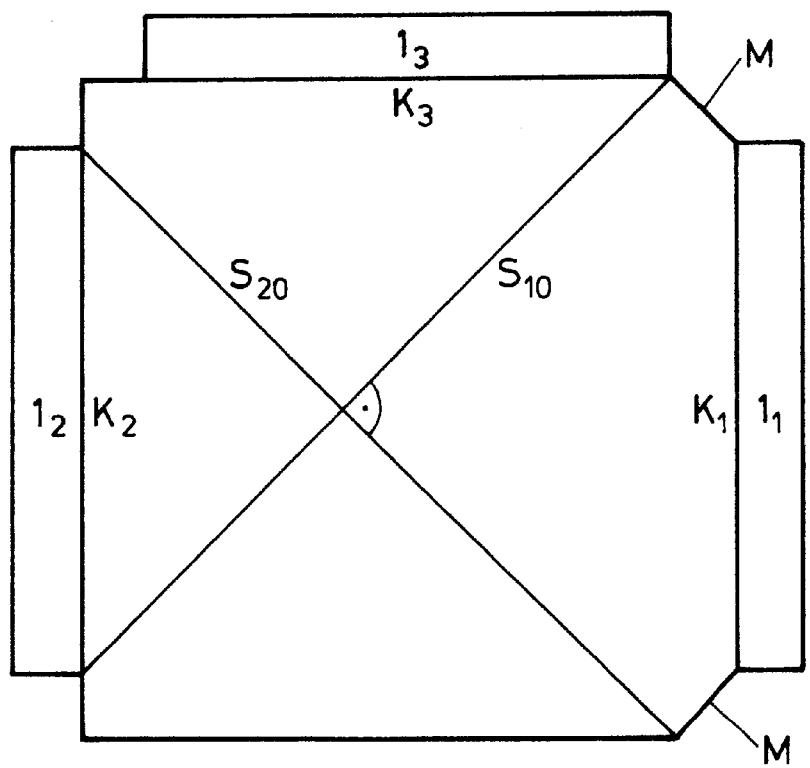
FIG. 6 An X-cube manufactured based on the process according to the invention with light valve arrangement thereon.

On the X-cube according to the invention as illustrated in the cross-sectional diagram of FIG. 6 the light valves arranged directly on the entrance or exit surfaces $K_1$ to $K_3$, in particular LCD panels $l_1$ to $l_3$, are shown.

In a preferred design version one of the two optical layer systems $S_{10}$, $S_{20}$ is continuous across the intersecting area SB shown in FIG. 5, preferably that layer system on which the light with the longer wave spectral band is reflected, that is, the RED reflector system in the preferred design version of the element according to the invention. In this connection explicit reference is made to FIG. 5 of said U.S. patent application Ser. No. 08/756,140.

The continuous reflector layer system $S_{10}$ deviates in the intersecting area SB by maximum 5 μm, preferably by maximum 2 μm from the plane defined by the system. Also in this respect reference is made to FIG. 5 and the corresponding description in said Appendix.

As all optical paths of the processed spectral bands, in particular for RED, GREEN and BLUE, have exactly the same length, light valves and in particular LCD panels can be applied directly on the optical element according to the invention, for example, by bonding or gluing. This saves high costs for holders and accurate alignment of such arrangements and in addition the design is more compact. As mentioned, such an element according to the invention can be used either as a color splitting element, in particular for CCD cameras, as well as as a color recombination element such as for projection devices.

The various characteristics of the invention are also based on the Swiss Priority Application No. 711/98, filed on Mar. 25, 1998.

What is claimed is:

1. Optical element made of a material that is transparent to light from at least a first ($L_1$) and a second ($L_2$) spectral band, with an embedded optical layer system ($S_{10}$, $S_{20}$) where the latter comprises:

a first (S10) optical system in a first plane which at least predominantly reflects light from the first ($L_1$) band, and at least predominantly transmits light from the second ($L_2$) band;

a second ($S_{20}$) optical system in a second plane that intersects the first plane in a central area (SB) of the body (30) and which at least predominantly transmits light from the first band ($L_1$) and at least predominantly reflects light from the second band ($L_2$);

with a first entrance or exit surface ($K_1$) for light from the first band ($L_1$);

with a second entrance or exit surface ($K_2$) for light from the second band ($L_2$);

with an entrance or exit surface ($K_4$) for light from the first band ($L_1$) as well as from the second band ($L_2$);

where the optical paths ($l_0$) for light of a selected wavelength from the first ($L_1$) band and for light of a selected wavelength from the second ($L_2$) band are identical, respectively considered between the assigned entrance or exit surfaces ($K_1$, $K_2$) via the assigned reflecting optical system ($S_{10}$, $S_{20}$) and to the exit or entrance surface ($K_4$).

2. Optical element according to claim 1 in which the material of the element along the optical paths for at least the light from the first ($L_1$) and the second ($L_2$) band is identical and the mechanical paths ($l_m$) corresponding to the optical paths are different for the light of the given wavelengths, thereby more different than caused by manufacturing tolerances.

3. Element according to claim 1 where the two entrance or exit surfaces ($K_1$, $K_2$) are formed by parallel, plane surfaces and where the first and second planes ($S_{10}$, $S_{20}$) intersect offset from a further plane parallel to and centered between said entrance or exit surfaces.

4. Element according to claim 1 where the first ($S_{10}$) and the second ($S_{20}$) planes intersect perpendicularly and the two entrance or exit surfaces ($K_1$, $K_2$) are preferably formed by parallel, plane surfaces, whereby, further preferred, on one hand the first entrance or exit surface ($K_1$) and the first plane ($S_{10}$) and on the other hand the second entrance or exit surface ($K_2$) and the second plane ($S_{20}$) define for an angle of 45° respectively.

5. Element according to claim 1 where the first and second optical system at least predominantly transmit light from a third spectral range ($L_3$) at least with nearly identical efficiency and in which a third entrance or exit surface is provided for this light, where an entrance or exit surface ($K_4$) for the light from all three bands ($L_1$, $L_2$, $L_3$) is provided.

6. Element according to claim 1 where the first two and a third entrance or exit surfaces ($K_1$, $K_2$, $K_3$) and the exit or entrance surface ($K_4$) are perpendicularly arranged in pairs and preferably define a body with a square cross-section.

7. Element according to claim 1 wherein the optical element material along the optical path of the light from the first ($L_1$) band has a refractive index $n_1$, and the optical element material along the optical path for light from the second ($L_2$) band has a refractive index $n_2$ and there is valid for the corresponding mechanical paths $l_{m1}$ and $l_{m2}$ the following formula:

$$l_{m1}/l_{m2} = n_2/n_1$$

within manufacturing tolerances of the optical element.

8. Element according to claim 1 where the first ($L_1$) spectral band is chosen as follows:

600 nm–800 nm wavelength, the second ($L_2$) spectral band:

400 nm–500 nm wavelength, and possibly a third ($L_3$) spectral band to be considered:

500 nm–600 nm wavelength.

9. Element according to claim 1 where the optical systems ($S_{10}$, $S_{20}$) are each formed by a layer system and where one of the two systems ($S_{10}$) is formed by a layer system that is continuous across the intersection area (SB) of the two layer systems.

10. Element according to claim 9 where the continuous layer system ($S_{10}$) is deformed in the intersection area (SB) by at most 5 µm, preferably by at most 2 µm, from the plane that is defined by that continuous layer system.

11. Element according to claim 1 where the cross-sectional surface perpendicular to the first and second planes ($S_{10}$, $S_{20}$) essentially forms a square on which edges (M) at one of the entrance or exit surfaces and mutually opposite, ($K_1$) are chamfered, preferably parallel to the first or second plane.

12. Element according to claim 1 where on at least two entrance or exit surfaces ($K_1$, $K_2$) a light valve arrangement ($l_1$, $l_2$) is applied, preferably an LCD arrangement, and where the entrance or exit surface is preferably coated with an electrode layer for the valve arrangement.

13. The element of claim 1 being arranged as a light combination element on a projection arrangement or as a light splitting element on an image recording arrangement, as preferably on a CCD camera.

14. Process for manufacturing an X-cube according to claim 1 where, starting with an extended cube (40) made of said material on which the two optical systems ($S_{10}$, $S_{20}$) are arranged in center planes, two corner prisms ($P_1$, $P_2$) are cut off ($T_1$, $T_2$) parallel to the diagonal surfaces of the cube, but asymmetrically to the latter, and subsequently the cross-sectional X-cube surface is completed by cutting of the remaining two corner sections perpendicular to said diagonal surface (D) of the cube.

15. Process according to claim 14 where the cube with the X-cube cross-sectional surface is sectioned into several X-cubes in direction perpendicularly to said cross-sectional area.

16. Process according to claim 14 where the parallel sectioning operations are respectively performed simultaneously.

* * * * *